UNITED STATES PATENT OFFICE.

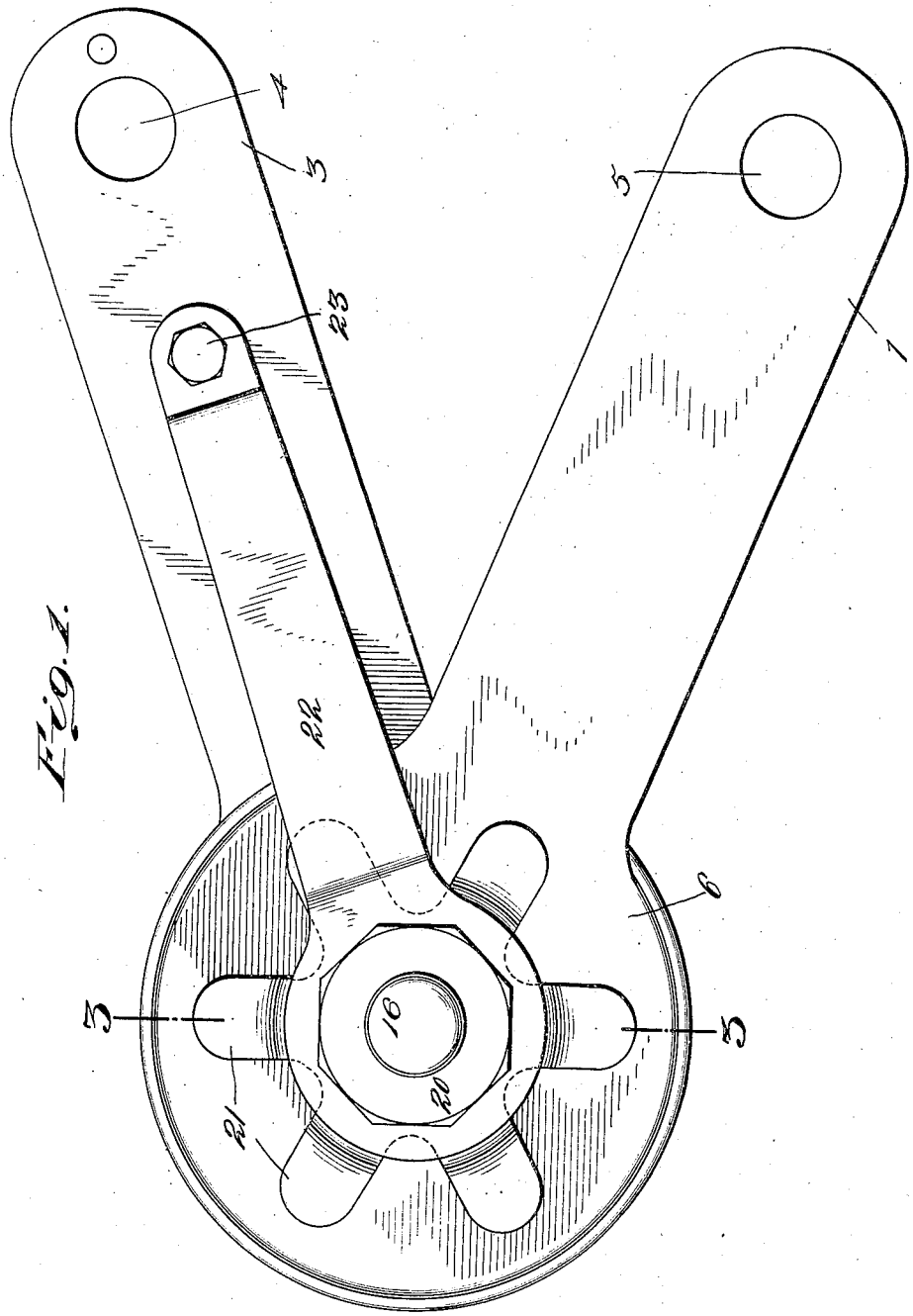

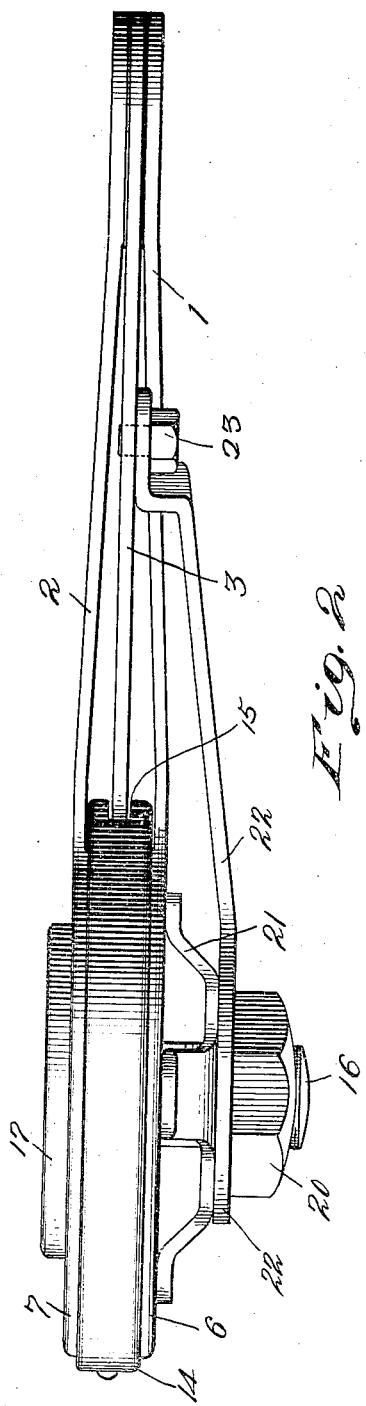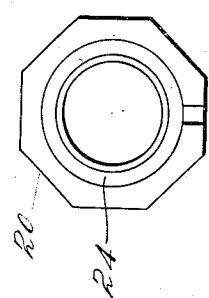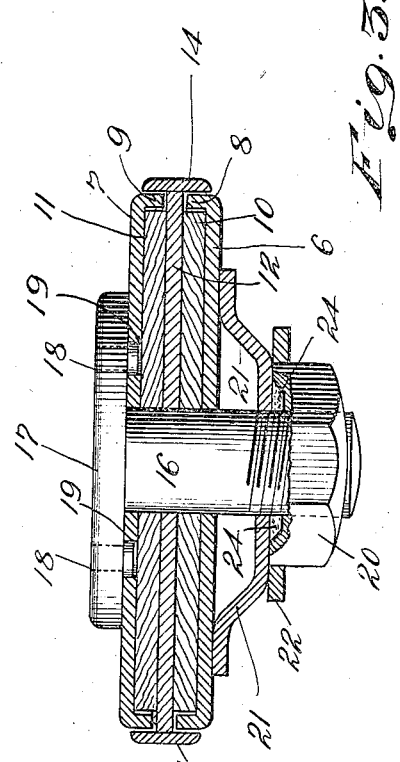

EDWARD V. HARTFORD, OF DEAL, AND LOUIS MASTRANGEL, OF HOBOKEN, NEW JERSEY; SAID MASTRANGEL ASSIGNOR TO SAID HARTFORD.

SHOCK-ABSORBER.

1,172,453.     Specification of Letters Patent.     Patented Feb. 22, 1916.

Application filed October 30, 1909. Serial No. 525,429.

*To all whom it may concern:*

Be it known that we, EDWARD V. HARTFORD and LOUIS MASTRANGEL, citizens of the United States, residing at Deal, in the county of Monmouth and State of New Jersey, and at Hoboken, in the county of Hudson and State of New Jersey, respectively, have invented certain new and useful Improvements in Shock-Absorbers, of which the following is a full, clear, and exact specification.

Our invention relates to devices for preventing shocks resulting from the vibration or recoil of vehicle springs being transmitted to the body of the vehicle and to improved means whereby excessive vibrations or recoils are prevented, and it has for its object to provide a frictional resistance to both the expansion and compression of such springs and to provide means whereby the frictional resistance is increased upon the compression and whereby such friction progressively increases as the expansion of the vehicle spring progresses, and to this end our invention consists in the provision of means associated with the frictional device for progressively increasing its frictional resistance as the expansion of the vehicle spring increases.

An embodiment of our invention is illustrated in the accompanying drawings wherein—

Figure 1 is a side elevation of our improved shock absorber. Fig. 2 is a top view thereof. Fig. 3 is a section on the line 3—3 of Fig. 1; and Fig. 4 is a rear elevation of the nut.

The outer operating arms 1, 2, and intermediate operating arms 3 are designed for attachment to the parts of the vehicle between which the vehicle spring is interposed, as, for instance, the outer arms may be attached to the axle or running gear and the intermediate arm to the vehicle body, and they are each provided at one end with means, as bolt holes 4, 5, for facilitating such attachment as will permit oscillatory movement of the arms. The other ends of the arms 1—2 and 3 are pivotally connected. Upon the pivotal end of each outer arm is shown secured a friction plate. The friction plates illustrated are extensions of the outer arms and are in the form of cups 6, 7, having inwardly-extending flanges 8, 9, at their peripheries. Within said cups are shown washers or disks 10, 11, of suitable friction material, as vulcanized fiber, wood, leather, etc. Intermediate such friction washers is shown a disk 12, which is, in the present illustration, a continuation of the intermediate arm 3. A dust-excluding band 14, is shown carried by the disk 12. The ring or band 14 is secured to the arm 3 to oscillate therewith. A slot at 15 permits the passage of arm 3 through it. The parts are shown secured together by a bolt 16 which passes transversely through central holes in the respective disks and washers. The bolt at one side is formed with an enlarged head 17. The head 17 is shown pinned to plate 7 by pins 18 for causing the bolt to oscillate with the plate 7 and arms 1 and 2. The pins enter perforations 19 in said plate 7. Upon the other end of the bolt is located nut 20. Between the nut and the outer plate 6 of the arm is located a wear-compensating spring-spider 21. A friction-controlling arm 22 is perforated at one end to fit the outer surface of nut 20, and at its opposite end is firmly attached to the inner operating arm 3, as by headed bolt 23. The nut 20 is threaded internally to pass on the end of bolt 16, which is threaded with a left-hand thread.

In operation the nut 20 will be set to produce a sufficient friction and the spring-spider will compensate for any loss of friction due to wear of the washers. The nut 20 is also provided with an annular channel or recess 24. In this recess a suitable absorbent material, such as flannel or the like, is located, and this may be saturated with oil so as constantly to lubricate the contacting surfaces of the nut and the spring-spider, as well as the screw threads. The outer arms as one arm and the intermediate arm being attached to the running gear and body of the vehicle respectively, will approach each other as the vehicle spring is compressed, whereupon the bolt being turned anti-clockwise (Fig. 1), by the outer arms which are attached to the bolt head, and the nut being turned clockwise through the friction-controlling arm 22, the nut will be loosened slightly upon the bolt. As the expansion of the spring takes place the arms and parts move in a direction opposite to that above described, and thus the greater the expansive movement of the spring the tighter will the nut be screwed and the greater will be the pressure between the friction members. We prefer to employ a comparatively long pitch upon the screw so that a relatively small movement of the nut will cause a substantial increase of pressure between the friction members upon the expansion of the spring. In the device illustrated the portions of the members which are in frictional engagement are plane or flat faces.

By the present improvement it will be seen that during the entire movement in one direction the friction may be acceleratedly increased and during the entire reverse movement the friction may be acceleratedly decreased.

It is obvious that the form illustrated is but one of many forms in which our invention can be embodied and we do not mean to limit ourselves to this particular form, as the same can be changed in many respects without departing from the spirit of our invention.

What we claim, however, and desire to secure by Letters Patent is:

1. In an anti-vibration device, the combination of a pair of friction members, each arranged and adapted to provide a seat for a friction disk, said disks and said members having plane surfaces in contact over their entire areas, a friction member interposed between said pair of friction disks and provided with oppositely disposed plane surfaces adapted to contact with the contiguous plane surfaces of said disks over their entire areas, means in engagement with one of said friction members at a plurality of equi-distant points for maintaining all of said friction members and said disks in contact, to produce a constant predetermined frictional resistance, means for operating said members against such frictional resistance and means for varying the degree of frictional resistance between said members concurrently with the operation thereof.

2. In an anti-vibration device, a pair of friction members and a pair of friction disks contained therein, a friction member positioned intermediate of said disks, means for maintaining all of said friction members and disks in contact over their entire contacting areas, and creating a constant predetermined frictional resistance between all of said contacting parts, means for operating two of said frictional members in one direction and the intermediate friction member in the opposite direction and means operating concurrently with the operation of said latter friction member to progressively increase the frictional resistance between all of said parts.

3. In an anti-vibration device, the combination of a plurality of friction members, means for applying pressure to one of said friction members at a plurality of equi-distant points thereon to maintain all of said frictional members in constant contact and create a predetermined frictional resistance between said members, operating arms connected to said friction members, each of said arms and its associated members being movable in opposite directions, means acting on said pressure applying means for effecting a variation in the frictional resistance of said friction members and an arm connected to one of said operating arms and to said latter means, whereby upon the movement of said operating arm in one direction, the frictional resistance between said members will be progressively increased and in the opposite direction, the frictional resistance will be progressively diminished.

4. In combination with the movable parts of a vehicle, an anti-vibration device embodying a plurality of friction members, a bifurcated arm connecting certain of said members to one of said movable parts, an arm connecting another of said members to the other vehicle part, a spider spring in contact with one of said members, means for adjusting said spider spring to apply pressure to all of said members and maintain them in contact to exert a predetermined frictional resistance to the movement of said arms, and an arm connected to said adjusting means and to one of said operating arms to interpose a gradually increasing frictional resistance to the movement of the arms in one direction and a gradually decreasing frictional resistance to the movement of the arms in the opposite direction.

5. In an anti-vibration device, the combination of a plurality of centrally apertured friction members, a bifurcated operating arm connected to certain of said members, an operating arm connected to another of said members, a bolt passing through the apertures in said members for maintaining said members in alinement, a spider spring in contact with one of said members, an adjusting nut in threaded engagement with said bolt and abutting against said spring, whereby the tension of the spring may be adjusted to create a predetermined frictional resistance between all of said friction members, and an arm connected to said nut and to one of said operating arms and movable with said latter arm to progressively vary the frictional resistance of said friction members.

In witness whereof we have hereunto severally set our names in the presence of two subscribing witnesses.

EDWARD V. HARTFORD.
LOUIS MASTRANGEL.

Witnesses:
C. K. POLLITZER,
ADOLPH F. DINSE.